United States Patent Office 2,932,561
Patented Apr. 12, 1960

---

2,932,561

GENERATION OF CARBON MONOXIDE AND HYDROGEN

Peter L. Paull, Weston, Conn., assignor to Texaco Development Corporation, New York, N.Y., a corporation of Delaware No Drawing. Application March 28, 1957
Serial No. 649,012

9 Claims. (Cl. 48—215)

The present invention relates to generation of carbon monoxide and hydrogen from liquid hydrocarbons. In one of its more specific aspects, it relates to a method for the production of carbon monoxide and hydrogen by partial oxidation of a liquid hydrocarbon containing naturally-occuring heavy metal compounds.

Recently, partial oxidation of hydrocarbons with oxygen to carbon monoxide and hydrogen has been developed commercially; the process is disclosed in U.S. 2,582,938 to Du Bois Eastman and Leon P. Gaucher. In this process a hydrocarbon, for example, fuel oil, is mixed with steam and reacted with air, oxygen, or oxygen-enriched air in a compact reaction zone at elevated pressure and a temperature in the range of about 2,000 to about 3,200° F. The reaction zone is free from packing and catalyst and has nearly minimum internal surface. The reaction may be conducted at atmospheric pressure or at an elevated pressure which may be as high as several hundred pounds per square inch. The reaction temperature, suitably about 2,600° F., is autogenously maintained. Preheating of the reactants is generally desirable. The amount of uncombined oxygen supplied to the reaction zone is limited so that near-maximum yields of carbon monoxide and hydrogen are obtained. The product consists essentially of carbon monoxide and hydrogen and contains relatively small amounts of unconverted carbon, hydrocarbon and carbon dioxide and is free from more than trace amounts of uncombined oxygen.

Petroleum commonly contains naturally-occurring heavy metal compounds, the most common of which are compounds of vanadium, nickel, iron, chromium and molybdenum. The ash from fuel oil, particularly heavy fuel oil, often contains quantities of heavy metals or their oxides which are harmful to high temperature refractories. The reaction zone in which the partial oxidation takes place generally comprises a steel pressure vessel provided with a high temperature refractory lining, for example, aluminum oxide. Ash from the fuel apparently combines with the refractory to form a composite having a greater volume or a lower melting point than that of the original refractory. This combination may cause the refractory to melt or spall away in a relatively short time (often a matter of a few hours) at usual operating temperatures of the order of 2,500 to 2,800° F. even though the reaction temperature is well below the rated temperature of the refractory. This results in overheating of the pressure vessel, a particularly dangerous condition when the gas generator is operated at elevated pressure. Vanadium and nickel appear to be particularly detrimental to high temperature aluminum oxide refractories, a type particularly useful as liners for reactors for partial oxidation of the fuel to carbon monoxide and hydrogen.

It has been found that the detrimental effects of the heavy metals can be avoided by introducing into oils containing heavy metals certain metal salts characterized by their ability to counteract the damaging effect of the metal component of the oil on the refractory. Among such counteractants are salts, particularly the oxides, sulfates and silicates of calcium, barium, strontium, zinc, aluminum, and magnesium. These elements are from groups II and III, series 3 to 8 of the periodic table of the elements. Compounds which are changed by heat to the foregoing, for example, the hydroxides, carbonates and nitrates, also may be used and are considered their equivalents. Natural or synthetic mixtures also may be used, e.g. talc, kaolin, dolomite, spinel, willemite, etc. These counteractants are effective to prevent refractory attack by the heavy metals with magnesia and zirconia refractories, as well as alumina refractories.

The counteractant may be water or oil soluble or insoluble. The amount of counteractant required to prevent refractory attack may be determined from analysis of the ash which results on burning the oil containing the heavy metal compounds. In general, the amount of a soluble counteractant required for best results, reckoned on the basis of the elemental metal, is at least five times the combined weights of the vanadium and nickel (reckoned as the metal) contained in the ash. If the counteractant is insoluble, the counteractant metal content should be at least eight times the combined weights of the vanadium and nickel. For example, if dolomite is used as the counteractant, the combined weights of the calcium and magnesium contained in the counteractant should be at least eight times the combined weights of the vanadium and nickel contained in the ash. As a soluble counteractant, magnesium sulfate (Epsom salt) is particularly useful. Soluble counteractant in aqueous solution may be injected into the oil, steam or oxygen supply to the gas generator or directly into the generator.

Insoluble powdered solid counteractant may be dispersed in the oil feed to form a stable dispersion, or may be separately introduced into the gasification reactor, for example, as dispersed in steam, oxygen-containing gas and water. Part of the fuel oil may be used for suspension of powdered solid counteractant, or a separate hydrocarbon, for example, a light distillate petroleum fraction, may be used as a carrier for the counteractant. A dispersion of solid counteractant in a carrier may be introduced into a reactant stream just prior to its introduction to the reactor or directly into the reactor. Insoluble counteractants should be in finely-divided form, preferably of the order of one micron in average particle diameter or smaller. The present invention provides a method for the production of carbon monoxide and hydrogen from ash-containing hydrocarbons by partial oxidation with free oxygen in which the ash is neutralized by a pacifier protecting the refractory lining of the gas generator.

In accordance with this invention, a hydrocarbon fuel containing mineral ash-forming constituents which are detrimental to the life of the refractory lining of the synthesis gas generator are introduced into the reaction zone of the gas generator together with sufficient free oxygen to react exothermically with the fuel to autogenously maintain a temperature in the range of about 2,000° F. to about 3,200° F. and to convert the carbon contained in the fuel substantially completely to carbon-containing gases, i.e. carbon oxides, primarily carbon monoxide, and methane, the methane content of which may be varied from a fraction of one percent by volume to several percent, depending upon the use of the product gas. The carbon dioxide content does not exceed 5 volume percent and generally is of the order of two to three percent. Ash-forming constituents of the fuel oil are associated with the counteractant forming a composite which is substantially harmless to the refractory lining of the gas generator. Carbon produced incidentally in the operation is associated with the composite. The composite may, in itself, be a valuable by-product of the process, useful, for example, in steel making.

Preferably the generator is operated at a pressure within the range of from about 100 to about 1000 pounds per square inch gauge. The temperature within the gas generator is preferably maintained within the range of 2,500 to 2,900° F.

The quantity of free oxygen supplied to the gas generator is limited so that the carbon content of the oil is substantialy completely converted to carbon monoxide. From about 1.3 to about 1.9 mols of free oxygen are supplied to the gas generator for each million B.t.u.'s gross heating value of the oil feed to the gas generator.

The hot gases from the generator containing entrained ash with some free carbon are contacted with water in a gas scrubbing and quenching operation in which the gases are rapidly cooled to a temperature below the reaction temperature. The solids are removed from the gas stream in a scrubbing operation, preferably a packed tower in which the gas is countercurrently contacted with water. The product gas is a mixture of carbon monoxide and hydrogen useful as feed gas for synthesis of hydrocarbons, methanol synthesis, or as a source of hydrogen for the synthesis of ammonia or for other purposes.

Obviously, many modifications and variations of the invention, as hereinbefore set forth, may be made without departing from the spirit and scope thereof, and therefore only such limitations should be imposed as are indicated in the appended claims.

I claim:

1. In a process for the generation of carbon monoxide and hydrogen from a hydrocarbon liquid containing naturally-occurring ash-forming constituents including naturally-occurring compounds of vanadium and of nickel wherein said hydrocarbon is subjected to reaction with steam and free oxygen at a temperature above 2,000° F. in an unpacked reaction zone comprising a refractory lining subject to injury as a result of said vanadium and nickel compounds contained in said fuel, the improvement which comprises introducing into said reaction zone together with said reactants and suspended therein a minor amount of a counteractant material selected from the group consisting of oxides, sulfates and silicates of calcium, barium, strontium, zinc, aluminum, and magnesium, said counteractant being supplied in an amount such that the weight of said metal in said counteractant is at least five times the combined weights of the vanadium and nickel contained in said compounds in said hydrocarbon liquid.

2. A process as defined in claim 1 wherein said counteractant is in the form of a puverized solid insoluble in said hydrocarbon liquid and is supplied in an amount such that the weight of said metal in said counteractant is at least eight times the combined weights of the vanadium and nickel contained in said ash.

3. A method as defined in claim 1 wherein said refractory is an aluminum oxide refractory.

4. A method as defined in claim 1 wherein said reaction is carried out at a pressure in the range of 100 to 1000 p.s.i.g.

5. A process as defined in claim 1 wherein said counteractant material comprises aluminum oxide.

6. A process as defined in claim 1 wherein said counteractant material comprises calcium oxide.

7. A process as defined in claim 1 wherein said counteractant material comprises magnesium oxide.

8. A process as defined in claim 1 wherein said counteractant material comprises magnesium sulfate.

9. A process as defined in claim 1 wherein said counteractant material comprises dolomite.

References Cited in the file of this patent

UNITED STATES PATENTS

| | | |
|---|---|---|
| 2,056,911 | Schiller et al. | Oct. 6, 1936 |
| 2,080,420 | Havekost et al. | May 18, 1937 |
| 2,346,754 | Hemminger | Apr. 18, 1944 |
| 2,526,652 | Garbo | Oct. 24, 1950 |
| 2,582,938 | Eastman et al. | Jan. 15, 1952 |
| 2,789,083 | Hardy | Apr. 16, 1957 |